Nov. 20, 1962 L. VELLUZ ETAL 3,065,140
HEPARIN DERIVATIVES AND METHODS OF PREPARING SAME
Filed July 2, 1959
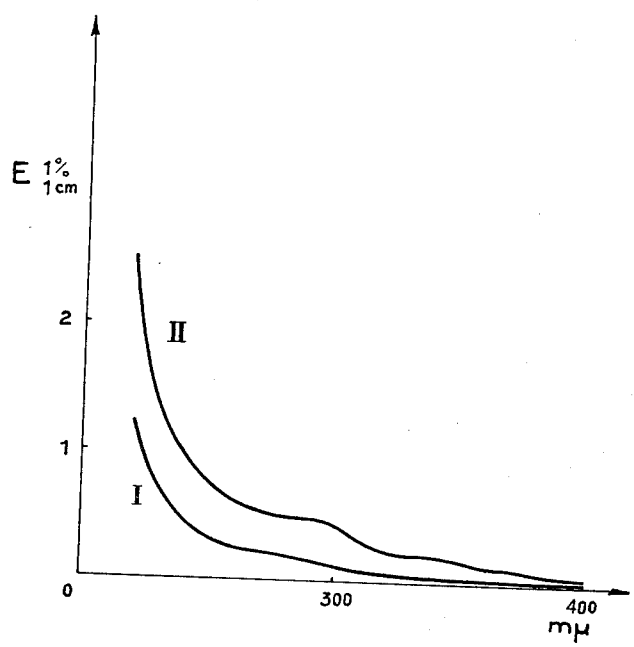
INVENTORS
Léon Velluz
Gérard Nomine
André Pierdet
Geneviève Rosseau
Lucien Penasse
BY
Hammond & Littell
ATTORNEYS

United States Patent Office 3,065,140
Patented Nov. 20, 1962

3,065,140
HEPARIN DERIVATIVES AND METHODS OF PREPARING SAME
Léon Velluz, Paris, Gérard Nominé and André Pierdet, Noisy-le-Sec, Genevieve Rousseau, Enghein-les-Bains, and Lucien Penasse, Paris, France, assignors to Roussel UCLAF, Societe Anonyme, Paris, France, a corporation of France
Filed July 2, 1959, Ser. No. 824,676
Claims priority, application France July 5, 1958
20 Claims. (Cl. 167—74)

This invention relates to N-desulfoheparin, its salts and its N-acylated derivatives and to a process for preparing these compounds. These N-acylated derivatives of N-desulfoheparin are high in antilipemic activity without having a high anticoagulant activity as compared with heparin. The ratio of their antilipemic activity to anticoagulant activity is 6 or higher as compared with about 1 for heparin.

It is known that heparin can be isolated from the lungs of mammals. Heparin is a compound having a molecular weight of about 25,000 and is characterized from the point of view of physiology by its anticoagulant activity. At the same time heparin also exhibits an antilipemic activity, as shown by the fact that alimentary lipemia in humans (turbidity of the blood caused by ingestion of a meal rich in lipids) is reduced a few minutes after intravenous injection of heparin. It is of therapeutic interest to dissociate these two activities of heparin and to enhance the antilipemic activity with respect to the anticoagulant effects.

An object of the present invention is the production of a physiologically active derivative of heparin having decreased anticoagulant activity without corresponding decreased antilipemic activity.

Another object of this invention is the production of N-desulfoheparin and its salts, and N-acylated derivatives of N-desulfoheparin and their salts.

A further object of the invention is the development of a process of producing N-desulfoheparin and its salts, and N-acylated derivatives of N-desulfoheparin and their salts.

A still further object of our invention is the development of a process of purifying heparin by preparing N-desulfoheparin and converting it to pure heparin with chlorosulfuric acid.

These and further objects of our invention will become apparent as this description proceeds.

We have found that heparin derivatives with enhanced antilipemic acivity with respect to the anticoagulant activity are achieved by a transformation of the sulfamic groups in the heparin molecule. By cleavage, the sulfamic group is transformed to the free amine group and N-desulfoheparin is obtained, which is hereinafter sometimes referred to as "heparamine." This heparamine has been found to be practically free from anticoagulant activity but possesses only a weak antilipemic activity. The N-acylated derivatives of this heparamine, however, exhibit the desired property, in that their antilipemic activity is enhanced with respect to their anticoagulant activity and, in certain cases, the antilipemic activity is almost identical to that of heparin while the anticoagulant activity is largely suppressed.

The FIGURE discloses a comparison of the ultra violet absorption spectra of heparin and heparamine.

The process of our invention therefore consists essentially of effecting a degradation of heparin into heparamine by the transformation of the sulfamic group ($-NHSO_3H$) to the free amine group ($-NH_2$) and introducing an acyl radical substituent on the nitrogen atom of the free amine group on the heparamine.

More particularly, our invention relates to the preparation of N-acylated derivatives of heparamine where the acyl radical is derived from carboxylic and sulfonic acids of the aliphatic, alicyclic, araliphatic, heterocyclic aromatic or carbocyclic aromatic series. The acyl radical is preferably selected from the group consisting of arylalkanoyl, aryloyl and arylsulfonyl radicals having 7 to 11 carbon atoms and lower alkanoyl radicals. We have found that for best results the acyl radical should contain a carbocyclic aromatic nucleus such as the benzene nucleus or the naphthalene nucleus. The carbocyclic aromatic nucleus may be substituted with other radicals such as etherified or esterified hydroxyl groups, alkyl groups, halogen atoms or nitro groups. These acyl radicals are derived from such carboxylic acids as benzoic acid, β-naphthoic acid, 3,5-dimethyl-benzoic acid, 3,4,5-trimethoxy-benzoic acid, p-acetoxy-benzoic acid, p-nitro-benzoic acid and 2,4-dinitro-benzoic acid. Additional carboxylic acids which have been or may be utilized in the acylating step are phenyl-acetic acid, 2-phenyl-butanoic acid, 2,4-dichloro-phenoxy-acetic acid, carboxylic acids of furan, such as furan-2-carboxylic acid, the lower fatty acids, such as acetic acid or isocaproic acid. In addition sulfonic acids, and particularly p-toluene-sulfonic acid can be utilized as the acyl derivative.

Our invention also relates to the products obtained by the process defined above, as novel industrial products. Moreover, heparamine constitutes an excellent means for purification of heparin since it can be readily transformed into pure heparin by reaction with chlorosulfonic acid.

In accordance with a preferred embodiment of the invention, the transformation of heparin into heparamine is effected by preparing the acid heparin, reacting the acid heparin with a lower alkanol, followed by cleavage under alkaline conditions of the ester formed thereby. This process, after cleavage with sodium hydroxide, gives mixtures which consist principally of heparamine. However, in view of the presence of other degradation products, the isolation of pure heparamine is practically impossible.

Crystallizable heparamine can be isolated in the form of the potassium salt, therefore if the alkaline cleavage is effected with sodium hydroxide, it is possible, after a double decomposition reaction with a potassium salt, to isolate the heparamine in the form of a potassium salt.

More advantageously, the alkaline cleavage is effected with the aid of potassium hydroxide, whereby the crystallized potassium salt of heparamine is obtained directly.

The subsequent acylation is carried out by treating the heparamine with a classic acylating agent capable of acylating an amino group, such as with acid halides, particularly chlorides, or simple or mixed anhydrides. The acylation is effected in a weakly basic aqueous medium so as to prevent the esterification of the alcohol groups.

Schematically the reactions of the invention can be represented as follows:

(a) $R-NH-SO_2ONa + H^+OH$
$\rightarrow R-NH-SO_2OH + NaOH$ (b) $R-NH-SO_2OH + CH_3OH$
$\rightarrow R-NH_3-O-SO_2OCH_3$ (c) $R-NH_3-O-SO_2OCH_3 \xrightarrow{KOH} R-NH_2 + CH_3KSO_4 + H_2O$ (d) $R-NH_2 + Cl-Acyl \rightarrow R-NH-Acyl + HCl$ wherein R—NH— represents the glucuronic acid-glucosamine chain of heparin and -Acyl represents an acyl radical.

The heparin which serves as the starting material may be prepared from an alkaline heparinate by subjecting it to the action of an acid cation exchange resin, followed by concentration of the acid heparin at low temperatures.

The reactions occur readily at room temperatures in the presence of solvents, especially water.

The following examples illustrate the invention without limiting it. More particularly, the temperatures and the nature of the solvents, acids or bases used in the course of the reactions may be varied, the cleavage of the sulfamic group may be effected by means other than alcoholysis and reaction with alkalies, and acyl groups other than those which are mentioned above may be used without departing from the scope of the present invention.

The temperatures in the examples are expressed in degrees centigrade.

EXAMPLE I

*Preparation of Heparamine*

(a) *Acid heparin.*—10 gm. of sodium heparinate (13.2% S, 11.6% water of hydration, anticoagulant activity 150 units/mgm., antilipemic activity 140 units/mgm.) are introduced into 60 cc. of water. The resulting solution is stirred, cooled to 0° C., and 120 cubic centimeters of acid Dowex 50 (a polystyrene-base cation exchange resin) are added thereto.

The resin is added very slowly so that the temperature does not rise above 0° C. The mixture is then stirred for 15 minutes and the resin is filtered off and washed with a few cc. of cold water. The filtrate is combined with the wash water and the solution is adjusted to contain 10% of the theoretical quantity of sodium (by again adding 4 volumes of Dowex if there is an excess of sodium, or by adding a few cc. of sodium hydroxide if there is a deficiency of sodium). The solution is then concentrated in vacuo in an atmosphere of nitrogen to 12–15% of its original volume.

(b) *Alcoholysis.*—250 cc. of methanol are added and the water content of the methanolic solution is adjusted to 10%. The solution is refluxed. Precipitation takes place as soon as the solution starts to boil. After heating at reflux for 15 minutes the mixture is cooled to room temperature, washed with methanol and dried. 7 gm. of a white powder consisting of N-desulfoheparin (heparamine) in the form of the quaternary methosulfate salt are obtained.

(c) *Alkaline cleavage.*—The product is dissolved in 35 cc. of water, the aqueous solution is cooled to 0° C., and about 5 cc. of 5 N sodium hydroxide are added dropwise to adjust the pH to a value of 12. After stirring the solution for 15 minutes it is poured into 500 cc. of ice cold methanol. The heparamine precipitates out. The precipitate is filtered off, washed several times by stirring it with methanol, and dried above calcium chloride. The yield is 7 gm. (85% of theory) of heparamine (sodium salt) having an optical rotation $[\alpha]_D^{20} = +67° \pm 2$ (c.=1% in water).
Ultra-violet spectrum: see the figure.
pH of a 10% aqueous solution: 9.8.
Water of hydration: 10%.
Anticoagulant activity: <1 unit/mgm.
Antilipemic activity: 5 to 7 units/mgm.
This white solid is soluble in water, but insoluble in the usual organic solvent, such as alcohol, ether, etc.
*Analysis.*—N—2.7%; S—9.7%.
Heparamine is not described in the literature.

EXAMPLE II

*Transformation of Heparamine into Heparin*

A mixture of 0.45 cc. of chlorosulfonic acid and 4 cc. of anhydrous pyridine is heated to 70° C. and stirred, and 0.25 gm. of heparamine (sodium) are added thereto. After 5 hours, 10 cc. of water are added and the heparin is separated by customary methods. 0.24 gm. of the sodium salt of heparin are thus obtained.

The anticoagulant activity is restored.

A determination of the molecular weight of this heparin proves that no depolymerization has taken place in the course of the preparation of heparamine. The value found is in the neighborhood of 25,000.

EXAMPLE III

*Preparation of Crystallized Heparamine*

(a) *Acid heparin.*—20 gm. of sodium heparinate (13.2% S, 11.6% water of hydration) are dissolved in 200 cc. of water and the resulting solution is passed through a column containing 80 cubic centimeters of acid Dowex 50 (polystyrene base cation-exchange resin) in 20 minutes of percolation. After rinsing the resin with 50 cc. distilled water, the effluent liquid and the wash water are combined.

(b) *Alcoholysis.*—10 cc. of 1 N sodium hydroxide and 9 volumes of methanol are added successively to the above prepared acid heparin solution. The reaction mixture is then stirred for 48 hours in at atmosphere of nitrogen at a temperature of 20° C. and 60 cc. of an aqueous solution containing 20% sodium acetate are added thereto. The partial methyl ester precipitates in the form of the sodium salt; it is separated by filtration or centrifuging and washed several times with methanol. After drying, the product in vacuo at 40° C., 15.5 gm. (about 95% of theory) of this methyl ester of heparamine, 10% solvated and having an optical rotation $[\alpha]_D^{20} = +64°$ (c.=1% in water) are obtained. The molecular weight of this product as determined by iodometric measurement is 23,880.

*Analysis of the dry product.*—NH$_2$ (Van Slyke), 2.68% (calculated as N) and S, 11.1 to 11.2%.

The partial esterification of the carboxyl groups is evidenced by a color reaction with ferric hydroxamate.

(c) *Alkaline cleavage.*—10 gm. of the heparamine salt obtained in accordance with (b) above are dissolved in 100 cc. of water and 100 cc. of 2 N sodium hydroxide are added to the solution accompanied by moderate agitation. After allowing the mixture to stand for 15 minutes in an atmosphere of nitrogen, 1000 cc. of methanol are added to the reaction mixture; the heparamine precipitates. It is filtered off, washed several times with methanol and dried in vacuo at 40° C. 10 gm. of heparamine (sodium salt) are obtained. The yield of this phase is practically quantitative. Color reaction of the esters to ferric hydroxamate: negative.

(d) *Crystallization.*—20 gm. of heparamine (sodium salt) obtained in accordance with (c) above are dissolved in 200 cc. water and the solution is heated to 50° C. on a water bath. 200 cc. of a 50% aqueous solution of potassium acetate and 20 cc. of methanol are successively added to the solution accompanied by stirring. The mixture is cooled, the heparamine (potassium salt) begins to crystallize out at about 35° C. The mixture is allowed to stand overnight, whereupon it is filtered and the filter cake is washed with a 25% aqueous solution of potassium acetate and 20% methanol, then with pure methanol. Yield: 10.6 gm. (50% of theory) heparamine (potassium salt), having an optical rotation $[\alpha]_D^{20} = +57°$ (c.=1% in water), and a molecular weight of 25,500 (iodometry).

*Analysis* $(C_{48}H_{65}O_{61}N_4S_7K_{11})_n$. — Calculated: C, 24.75%; H, 2.8%; N, 2.3%; S, 9.6%; K, 18.5%. Found: C, 25.2%; H, 3.1%; N, 2.3%; S, 9.5%; K, 18.8%. Amino-nitrogen content=2.2% (potentiometry) and 2.1% (Van Slyke), theory 2.4%.

Analysis of a product which has been recrystallized 4 times under the same conditions furnishes the following results: C, 24.75%; H, 3.0%; N, 2.4%; S, 9.3%. The yield on recrystallization is 90%.

(e) *Acid heparamine.*—By passing an aqueous solution of potassium salt of heparamine through a column containing Dowex 50 resin, in acid form, free heparamine is obtained.

EXAMPLE IV

*Preparation of N-Benzoyl Heparamine (N-Benzoyl-N-Desulfoheparin)*

0.5 gm. of heparamine (sodium) obtained in accordance with Example I is dissolved in 10 cc. of a saturated sodium bicarbonate solution; 30 minutes later 1.1 cc. of benzoyl chloride are added and the reaction mixture is stirred for 3 hours at room temperature. It is then poured into 100 cc. ethanol, whereby an abundant white precipitate is formed. The liquid phase is acidified to a pH of 2 with concentrated hydrochloric acid, and the precipitate is filtered off and washed with ethanol containing 10% water until the chlorides disappear from the washing solution. After drying, 0.520 to 0.590 gm. (86.5 to 98% of theory) of N-benzoyl heparamine, an amorphous white solid, are obtained. It is 10 to 15% solvated, soluble in water and insoluble in the customary organic solvents, such as alcohol, ether, acetone, etc.

Test for —$NH_2$: negative
Ultraviolet spectrum: max.=228 m$\mu$, $$E_{1\ cm.}^{1\%} = 162$$

(which represents 16.8% benzoyl per gm., theory being 17.0%).
Anticoagulant activity: 3 units/mgm.
Antilipemic activity: 29 units/mgm.
Nitrogen content: 2.4%

This compound is not described in the literature.

EXAMPLE V

*Preparation of N-3,5-Dinitrobenzoyl-Heparamine (N-3,5-Dinitrobenzoyl-N-Desulfoheparin)*

0.5 gm. of heparamine (sodium) obtained in accordance with Example I is dissolved in 10 cc. of a saturated solution of sodium bicarbonate (pH=8.5) and 1.125 gm. of 3,5-dinitrobenzoyl chloride are added very slowly to this solution. The reaction mixture is stirred for 3 hours at room temperature, the sodium dinitrobenzoate which precipitates is filtered off, and the solution is concentrated to ⅓ of its original volume by heating it gently under vacuum in an atmosphere of nitrogen. By adding 50 cc. of ethanol the N-3,5-dinitrobenzoyl-heparamine is caused to precipitate out. The precipitate is filtered off, washed with alcohol containing a few drops of hydrochloric acid and then with alcohol alone, and dried under vacuum overnight. The yield is 0.550 gm. (80 to 84% of theory) of a white amorphous solid having an optical rotation $[\alpha]_D^{20} = +94°$ (c.=1% in water). It is soluble in water and insoluble in the customary organic solvents.

—$NO_2$ content: 12.3% (theory 13.0%)
Test for —$NH_2$: traces
Ultraviolet spectrum: max.=237 m$\mu$, $$E_{1\ cm.}^{1\%} = 239 \text{ in water}$$

Anticoagulant activity: 1 to 4 units/mgm.
Antilipemic activity: 100 to 150 units/mgm.
*Analysis.*—N—5.8%; S—6.6%. This compound is not described in the literature.

EXAMPLE VI

*Preparation of N-3,5-Dimethyl-Benzoyl-Heparamine (N-3,5-Dimethyl-Benzoyl-N-Desulfoheparin)*

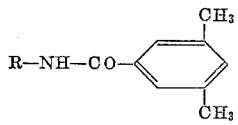

wherein R—NH— represents the glucuronic acid-glucosamine chain of heparin.

10 gm. of heparamine, obtained in accordance with Example I, are introduced into 200 cc. of an 0.5% solution of sodium carbonate in an atmosphere of nitrogen, accompanied by stirring, and the mixture is heated to 80° C. for 2½ hours. The volume is then reduced to about 25 cc. under vacuum, whereby a thick pale yellow solution is obtained. 65 cc. of alcohol are added and the pH of the solution is adjusted to 3 by adding hydrochloric acid. Carbon dioxide is evolved. An additional 150 cc. of alcohol are added, the solution is scratched and filtered, and the filter cake is washed with 90% alcohol and dried under vacuum. The product thus obtained is dissolved in 200 cc. of a saturated solution of sodium bicarbonate, 100 cc. of benzene are added thereto and the mixture is heated to 50° C. Thereafter, while stirring, a solution of 30 to 34 gm. of 3,5-dimethyl-benzoyl chloride (prepared in accordance with Snyder et al., J. Am. Chem. Soc., 63, 3280 (1941)) in 85 cc. of benzene is slowly added in portions of 12 cc. each. The interval between the introduction of one portion and the next is 1 hour, and the addition of the entire solution of the acylating agent takes about 10 hours. The pH of the reaction mixture is maintained during that time at 8 to 8.5 by addition of sodium bicarbonate. The reaction mixture is allowed to stand at room temperature overnight and the benzene solvent is distilled off under vacuum. The mixture is filtered and the insolubles are washed with water. The combined aqueous phases are concentrated to a volume of 200 cc. 100 cc. of alcohol are added thereto, whereby an abundant precipitate forms. The liquid phase is acidified with hydrochloric acid to a pH of 2.5 and the precipitate flocculates 1400 cc. of alcohol are added thereto. The mixture is filtered and the filter cake is washed with 90% alcohol and dried under vacuum. 8.68 gm. (66.5% of theory) of N-3,5-dimethyl-benzoyl-heparamine are obtained. The product is 13.8% hydrated and has an optical rotation $[\alpha]_D^{20} = +70.5°$ (c.=1% in water). The pH of its aqueous solution is about 4.5. This novel compound is an amorphous cream colored solid, very soluble in water, soluble in methylene chloride and propylene glycol but insoluble in alcohol, ether, acetone, benzene and chloroform.

*Analysis.*—C, 37.2% to 37.4%; H, 4.2%; N, 2.0%; S, 8.4%.

The ultraviolet spectrum, compared to that of 3,5-dimethyl-benzoyl-cyclohexyl-amine, shows that the product thus obtained consists of 90% of the acylated compound.

Anticoagulant activity: 12.5 units/mgm.
Antilipemic activity: 147 units/mgm.

The product is not described in the literature.

An important advantage of the compound is that it does not have nitro-substituents attached to the benzene ring of the acyl radical.

EXAMPLE VII

*Preparation of N-β-Naphthoyl-Heparamine (N-β-Naphthoyl-N-Desulfoheparin)*

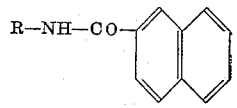

wherein R—NH— represents the glucuronic acid-glucosamine chain of heparin.

2.5 gm. of heparamine, obtained in accordance with Example I, are dissolved at 25° C. in 70 cc. of a saturated aqueous solution of sodium bicarbonate and 10 cc. of benzene, accompanied by stirring. In the course of about 5 hours 4.9 gm. of β-naphthoyl chloride dissolved in 60 cc. of benzene are added and the resulting reaction mixture is stirred overnight at 25° C. After filtration, the pH of the filtrate is adjusted to 3 to 3.5 by addition of 12 N formic acid, and the β-naphthoic acid formed during the course of the reaction is removed by extraction with ether. By addition of 2 N of sodium hydroxide, the pH is readjusted to 8.3 and the mixture is then poured into 5 volumes of ethanol. The naphthoyl derivative precipitates. It is filtered off, washed with ethanol and dried under vacuum at room temperature. The yield is 2.3 gm. (70% of theory) of the sodium salt of N-β-naphthoyl-heparamine, which is a white solid hydrated with 10 to 16% water. The novel derivative has an optical rotation of $[\alpha]_D^{20}=+114°$ (c.=0.2% in water) and is very soluble in water but insoluble in alcohol and ether.

Its ultraviolet spectrum, compared to that of β-naphthoyl-cyclohexyl-amine, shows that the product consists of 78.5% of the acylated compound.

Anticoagulant activity: 9.4 units/mgm.
Antilipemic activity: 122 units/mgm.

This product is not described in the literature.

N-β-naphthoyl-heparamine exhibits a considerable antilipemic activity, and the ratio of its antilipemic activity with respect to its anticoagulant activity is superior to that of N-3,5-dimethyl-benzoyl-heparamine.

Other N-acylated derivatives of heparamine were prepared by following the methods described in Examples IV to VII. The following table shows the physical constants as well as the yields of these products.

The common characteristics of these compounds are amorphous state, white color, 10 to 15% hydration, solubility in water and dilute aqueous acids and alkalis, and insolubility in the customary organic solvents.

It will be understood that the invention is not limited to the particular methods above described which are given only for purposes of illustration. More particularly, the nature of the solvents or the reaction temperature may be varied without departing from the scope of the invention. While certain specific embodiments of the invention have been illustrated, it is readily apparent to one skilled in the art that various changes and modifications may be made therein without departing from the spirit of the invention or the scope of the following claims.

We claim:

1. A compound selected from the group consisting of N-desulfoheparin and N-acyl-N-desulfoheparin wherein the acyl radical is selected from the group consisting of arylalkanoyl, aryloyl and arylsulfonoyl radicals having 7 to 11 carbon atoms and lower alkanoyl radicals and their non-toxic salts.

2. A compound selected from the group consisting of N-acyl-N-desulfoheparin wherein the acyl radical is selected from the group consisting of arylalkanoyl, aryloyl and arylsulfonoyl radicals having 7 to 11 carbon atoms and lower alkanoyl radicals and their non-toxic acid salts.

TABLE

| Example | Amide | Ultraviolet Spectra | Anticoagulant Activity, Units/mgm. | Antilipemic Activity, Units/mgm. |
|---|---|---|---|---|
| I | R—NH₂ (sodium) | | 1 | 5–7 |
| IV | R—NH.CO—⟨phenyl⟩ | max. 228 mμ, $E_{1\,cm.}^{1\%}$=162 | 3 | 29 |
| V | R—NH.CO—⟨phenyl-2,4-(NO₂)₂⟩ | max. 237 mμ, $E_{1\,cm.}^{1\%}$=239 | 1–4 | 100–150 |
| VI | R—NH.CO—⟨phenyl-2,6-(CH₃)₂⟩ | | 12.5 | 147 |
| VII | R—NH.CO—⟨naphthyl⟩ | | 9.4 | 122 |
| VIII | R—NH.CO—⟨phenyl⟩—NO₂ | max. 271 mμ, $E_{1\,cm.}^{1\%}$=205 | 11 | 103 |
| IX | R—NH—CO—⟨phenyl⟩—OCO—CH₃ | max. 242 mμ, $E_{1\,cm.}^{1\%}$=145 | 15 | 130 |
| X | R—NH—CO—⟨phenyl-OMe,OMe,OMe⟩ | max. 290 mμ, $E_{1\,cm.}^{1\%}$=77 | 6.3 | 39.3 |
| XI | R—NH—CO—CH(CH₂—CH₃)—⟨phenyl⟩ | presence of phenyl radicals | 3 | 28 |
| XII | R—NH—CO—CH₂—O—⟨phenyl-2,4-Cl₂⟩ | max. 282.5 mμ, $E_{1\,cm.}^{1\%}$=19.1 | 7.3 | 41 |
| XIII | R—NH—SO₂—⟨phenyl⟩—CH₃ | max. 230 mμ, $E_{1\,cm.}^{1\%}$=143 | 11.5 | 130 |

R—NH—represents the glucuronic acid-glucosamine chain of heparin.

3. N-desulfoheparin in its free acid form.
4. N-desulfoheparin and its non-toxic salts.
5. The sodium salt of N-desulfoheparin.
6. The crystalline potassium salt of N-desulfoheparin.
7. N-benzoyl-N-desulfoheparin and its non-toxic salts.
8. N-p-nitrobenzoyl-N-desulfoheparin and its non-toxic salts.
9. N-3,5-dinitrobenzoyl-N-desulfoheparin and its non-toxic salts.
10. N-p-acetoxy-benzoyl-N-desulfoheparin and its non-toxic salts.
11. N-3,4,5-trimethoxybenzoyl-N-desulfoheparin and its non-toxic salts.
12. N-2-phenyl-butanoyl-N-desulfoheparin and its non-toxic salts.
13. N-2,4-dichlorophenoxy-acetyl - N - desulfoheparin and its non-toxic salts.
14. N-3,5-dimethylbenzoyl-N-desulfoheparin and its non-toxic salts.
15. N-β-naphthoyl-N-desulfoheparin and its non-toxic salts.
16. N-p-toluenesulfonyl-N-desulfoheparin and its non-toxic salts.
17. A process for the preparation of N-acylated-N-desulfoheparin compounds which comprises reacting acid heparin with a lower alkanol, cleaving the ester formed by treatment with an alkali metal hydroxide at room temperature, separating the N-desulfoheparin and acylating with an acylating agent under acylating conditions.

18. A process for the preparation of N-desulfoheparin which comprises reacting acid heparin with a lower alkanol, cleaving the ester formed by treatment with an alkali metal hydroxide at room temperature and separating N-desulfoheparin salt.

19. A process for the preparation of N-acylated-N-desulfoheparin which comprises dissolving acid heparin in aqueous methanol, cleaving the ester formed by adding at room temperature sufficient alkali metal hydroxide to raise the pH of the solution to about 12, separating the alkali metal salt of N-desulfoheparin, reacting the N-desulfoheparin salt with an acyl chloride in an organic solvent and separating said N-acylated-N-desulfoheparin.

20. The process of purifying heparin which comprises contacting heparin with an acid ion exchange resin, reacting the acid heparin produced with a lower alkanol, cleaving the ester formed by treatment with an alkali metal hydroxide at room temperature, separating N-desulfoheparin, dissolving said N-desulfoheparin in an organic base, adding chlorosulfonic acid and separating purified heparin.

References Cited in the file of this patent

Kantor: J.A.C.S., January 5, 1957, pp. 152–3.
Jeanloz: Federation Proceedings 17, December 1958, pp. 1082–6.
Wolstenholme: Ciba Foundation Symposium on the Chemistry and Biology of Mucopolysaccharides, 1958, Churchill Ltd., England, pp. 85–89.

UNITED STATES PATENT OFFICE
CERTIFICATE OF CORRECTION

Patent No. 3,065,140                 November 20, 1962

Léon Velluz et al.

It is hereby certified that error appears in the above numbered patent requiring correction and that the said Letters Patent should read as corrected below.

Column 3, line 27, after "Dowex" insert -- 50 --; column 4, line 64, for "9.3%" read -- 9.9% --.

Signed and sealed this 21st day of May 1963.

(SEAL)
Attest:

ERNEST W. SWIDER                 DAVID L. LADD
Attesting Officer                 Commissioner of Patents